United States Patent
Bae et al.

(10) Patent No.: US 11,614,162 B2
(45) Date of Patent: Mar. 28, 2023

(54) METHOD OF CONTROLLING AN ELECTRIC OIL PUMP OF A VEHICLE

(71) Applicants: HYUNDAI MOTOR COMPANY, Seoul (KR); KIA CORPORATION, Seoul (KR)

(72) Inventors: Bong Uk Bae, Daegu (KR); Se Hwan Jo, Bucheon-si (KR); Seong Min Son, Pohang-si (KR); Ki Bum Kim, Seoul (KR); Jin Young Hwang, Suwon-si (KR); Kyung Moo Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/734,537

(22) Filed: May 2, 2022

(65) Prior Publication Data
US 2023/0003297 A1 Jan. 5, 2023

(30) Foreign Application Priority Data
Jul. 2, 2021 (KR) ........................ 10-2021-0087071

(51) Int. Cl.
*F16H 61/00* (2006.01)
*F16H 61/02* (2006.01)
(52) U.S. Cl.
CPC ..... *F16H 61/0031* (2013.01); *F16H 61/0265* (2013.01); *F16H 2306/32* (2013.01)

(58) Field of Classification Search
CPC .. F16H 61/0031; F16H 61/0265; F16H 61/12; F16H 2306/32; F16H 59/72
See application file for complete search history.

(56) References Cited

U.S. PATENT DOCUMENTS

| 2013/0136623 | A1* | 5/2013 | Hwang | F04B 49/22 |
| | | | | 417/42 |
| 2017/0268662 | A1* | 9/2017 | Song | F16H 61/686 |
| 2017/0355363 | A1* | 12/2017 | Lee | B60K 6/48 |
| 2018/0105162 | A1* | 4/2018 | Katakura | B60W 10/02 |

FOREIGN PATENT DOCUMENTS

KR 20190118063 A 10/2019

* cited by examiner

*Primary Examiner* — Edwin A Young
(74) *Attorney, Agent, or Firm* — Lempia Summerfield Katz LLC

(57) ABSTRACT

A method of controlling an electric oil pump (EOP) of a vehicle includes: confirming a gear shift type when a gear shift of a vehicle is started; compensating for the number of revolutions of the EOP according to the confirmed gear shift type; confirming whether a measured line pressure converges on a command line pressure while the compensating for the number of revolutions of the EOP according to the gear shift type is performed; and, when it is determined that the measured line pressure does not converge on the command line pressure, additionally compensating for the number of revolutions of the EOP.

7 Claims, 4 Drawing Sheets

FIG. 3

| GEAR SHIFT TYPE | Power Off upshift | Power Off Downshift | . . . | Power On upshift | Kick Downshift |
|---|---|---|---|---|---|
| GEAR SHIFT PHASE | 4 | 5 | . . . | 6 | 2 |

METHOD OF CONTROLLING AN ELECTRIC OIL PUMP OF A VEHICLE

CROSS REFERENCE TO RELATED APPLICATION

The present application claims priority to Korean Patent Application No. 10-2021-0087071, filed on Jul. 2, 2021, the entire contents of which are incorporated herein for all purposes by this reference.

BACKGROUND

Field of the Disclosure

The present disclosure relates to a method of controlling an electric oil pump (EOP) of a vehicle, and more particularly, to a technology for controlling an EOP provided to supply oil required for a transmission.

Description of the Related Art

Among hybrid vehicles, in some cases, a gear shift mechanism (hereinafter simply referred to as a "transmission") performs a gear shift by controlling a planetary gear device using a plurality of friction elements similar to a conventional gear shift mechanism of an automatic transmission (AT). The transmission controls the friction elements using a hydraulic pressure.

In hybrid vehicles equipped with the above-described transmission, an electric oil pump (EOP) is often provided to supply a required hydraulic pressure in the transmission.

The foregoing is intended merely to aid in the understanding of the background of the present disclosure. The foregoing is not intended to mean that the present disclosure falls within the purview of the related art that is already known to those having ordinary skill in the art.

SUMMARY

Accordingly, the present disclosure has been made, keeping in mind the above problems occurring in the related art. The present disclosure is intended to propose a method of controlling an electric oil pump (EOP) of a vehicle capable of appropriately supplying, in a hybrid vehicle equipped with a hydraulically controlled transmission, a required hydraulic pressure for the transmission. The hydraulic pressure is required to improve fuel efficiency of the hybrid vehicle, maintain constant gear shift performance, and prevent a gear shift failure even when an amount of hydraulic leakage is increased due to aged deterioration of the transmission.

According to one aspect, a method of controlling an EOP of a vehicle is provided. The method includes: confirming a gear shift type when a gear shift of a vehicle is started; compensating for the number of revolutions of the EOP according to the confirmed gear shift type; confirming whether a measured line pressure converges on a command line pressure while the compensating for the number of revolutions of the EOP according to the gear shift type is performed; and additionally compensating for the number of revolutions of the EOP when it is determined that the measured line pressure does not converge on the command line pressure.

In the compensating for the number of revolutions of the EOP, according to the confirmed gear shift type, the number of revolutions of the EOP may be compensated for from a time at which the gear shift is started until a gear shift phase set for each gear shift type becomes a predetermined compensation termination phase.

In the compensating for the number of revolutions of the EOP, according to the confirmed gear shift type, the EOP may be controlled at the number of revolutions obtained by adding the number of revolutions for gear shift situation compensation, which is determined according to a current line pressure and an oil temperature, to a basic number of revolutions of the EOP.

In the additionally compensating for the number of revolutions of the EOP, the EOP may be controlled at the number of revolutions obtained by additionally adding the number of revolutions of additional compensation, which is determined according to the current line pressure and the oil temperature, to the number of revolutions obtained by adding the number of revolutions of the gear shift situation compensation to the basic number of revolutions of the EOP.

In the confirming of whether the measured line pressure converges on the command line pressure, when the measured line pressure is smaller than a pressure obtained by subtracting a predetermined measurement deviation from the command line pressure, it may be determined that the measured line pressure does not converge on the command line pressure.

When the confirmed gear shift type is a power-on up-shift type, the compensation termination phase may be set to a higher gear shift phase than when the gear shift type is a kick-down shift type.

When the gear shift phase reaches the compensation termination phase and thus the compensating for the number of revolutions of the EOP according to the gear shift type is terminated, the EOP may be controlled at the basic number of revolutions of the EOP.

BRIEF DESCRIPTION OF THE DRAWINGS

The above and other objects, features, and other advantages of the present disclosure should be more clearly understood from the following detailed description when taken in conjunction with the accompanying drawings, in which:

FIG. 3 is a diagram illustrating a map of a compensation termination phase according to a gear shift type;

DETAILED DESCRIPTION

Figure 1:
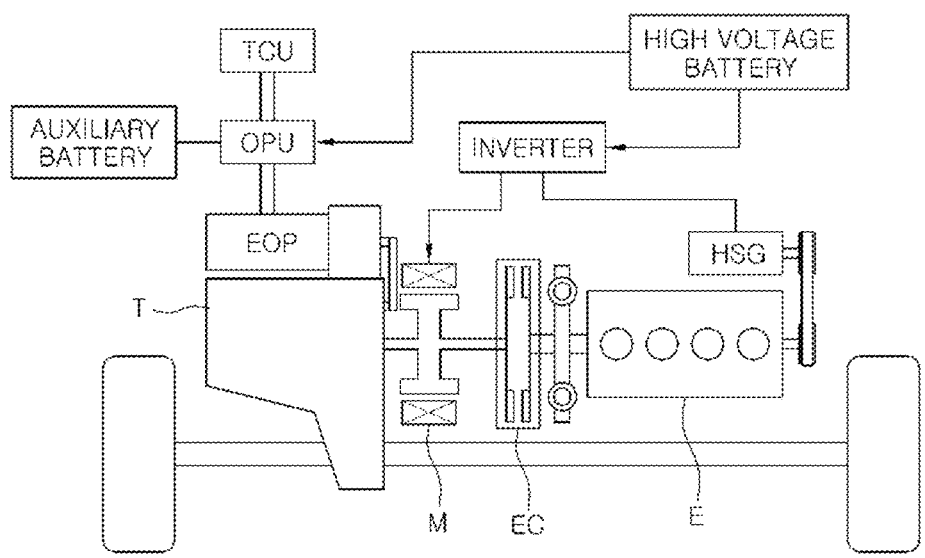
FIG. 1 is a diagram illustrating a powertrain of a hybrid vehicle to which the present disclosure is applicable.

Specific structural and functional descriptions of the embodiments of the present disclosure disclosed in this disclosure or application are illustrative only for the purpose of describing the embodiments. Further, the embodiments according to the present disclosure may be implemented in various forms and should not be construed as being limited to embodiments described in this disclosure or application.

The embodiments according to the present disclosure may be variously modified and may have various forms, though specific embodiments are illustrated in the drawings and described in detail in this disclosure or application. It should be understood, however, that it is not intended to limit the embodiments according to the concept of the present disclosure to specific disclosed forms, but instead to include all modifications, equivalents, and alternatives falling within the spirit and scope of the present disclosure.

The terms "first," "second," and/or the like may be used to describe various components, but the components should not be limited by these terms. These terms may be used only for the purpose of distinguishing one component from another component. For example, a first component may be referred to as a second element, and similarly, the second component may also be referred to as the first component without departing from the scope of the present disclosure.

When a component is referred to as being "connected," or "coupled" to another component, it may be directly connected or coupled to another component. However it should be understood that yet another component may exist between the component and another component. On the contrary, when a component is referred to as being "directly connected" or "directly coupled" to another, it should be understood that another component may not be present between the component and another component. Other expressions describing the relationship between components, i.e., "between" and "immediately between," or "adjacent to" and "directly adjacent to" should also be construed as described above.

Terms used herein are used only for the purpose of describing specific embodiments, and are not intended to limit the present disclosure. Unless the context clearly dictates otherwise, the singular form includes the plural form. In this disclosure, the terms "comprising," "having," or the like are used to specify that a feature, a number, a step, an operation, a component, an element, or a combination thereof described herein exists. They do not preclude the presence or addition of one or more other features, numbers, steps, operations, components, elements, or combinations thereof.

Unless defined otherwise, all terms including technical or scientific terms used herein have the same meaning as commonly understood by those having ordinary skill in the art to which the present disclosure pertains. General terms used herein that are defined in a dictionary shall be construed to have meanings that are consistent in the context of the relevant art. Such terms should not be interpreted as having an idealistic or excessively formalistic meaning unless clearly defined in this disclosure. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to the accompanying drawings. Like reference numerals denote like members throughout the drawings.

FIG. 1 is a diagram illustrating a configuration of a hybrid vehicle to which the present disclosure is applicable. The hybrid vehicle is configured such that power of an engine E is transmittable to a transmission T through an engine clutch EC and a motor M is provided on an input shaft of the transmission T to form a hybrid powertrain.

The transmission T is provided with an electric oil pump (EOP) for generating an oil flow rate to be used for controlling the transmission T and the engine clutch EC under the control of an oil pump control unit (OPU).

For reference, a hybrid starter and generator (HSG) is provided in the engine E to start the engine E and generate power. The motor M is installed in the engine E and controlled by an inverter.

The transmission T is controlled by a transmission control unit (TCU), and the OPU is also controlled by the TCU. Thus, the following present disclosure is substantially performed by a controller such as the TCU or the OPU, and the OPU serves to directly drive the EOP under the control of the TCU.

Figure 2:
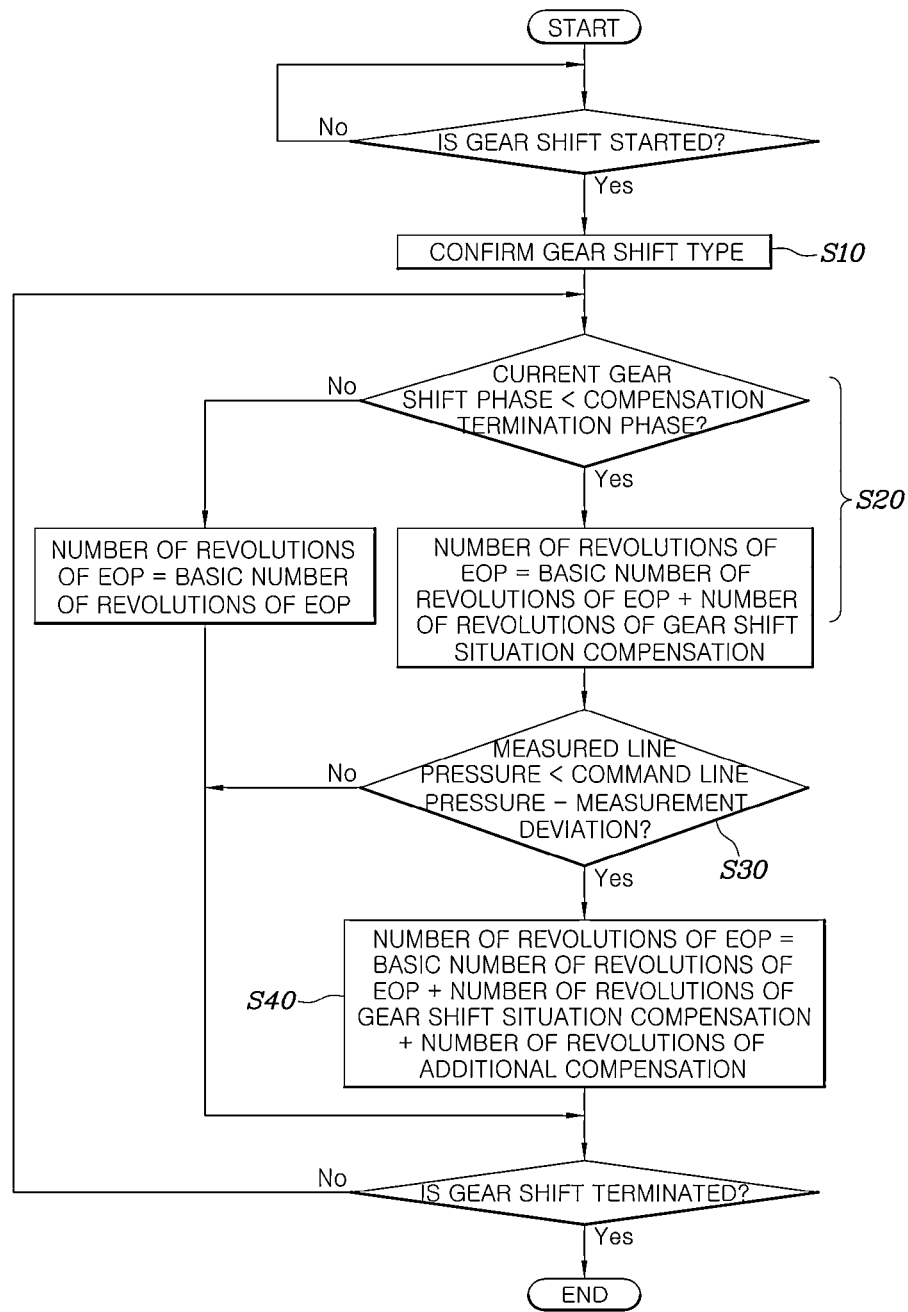
FIG. 2 is a flowchart illustrating an embodiment of a method of controlling an electric oil pump (EOP) of a vehicle according to the present disclosure.
Figure 4:
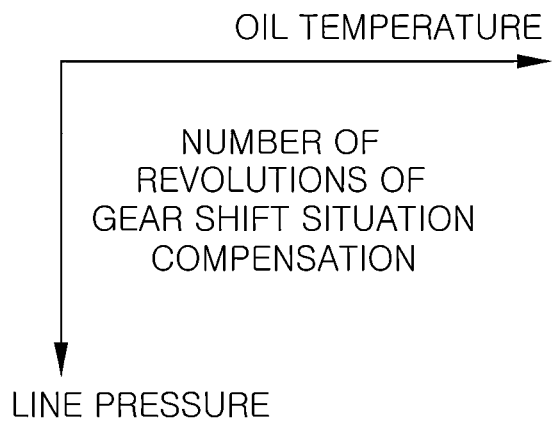
FIG. 4 is a diagram illustrating a map of the number of revolutions of gear shift situation compensation according to a line pressure and an oil temperature.
Figure 5:
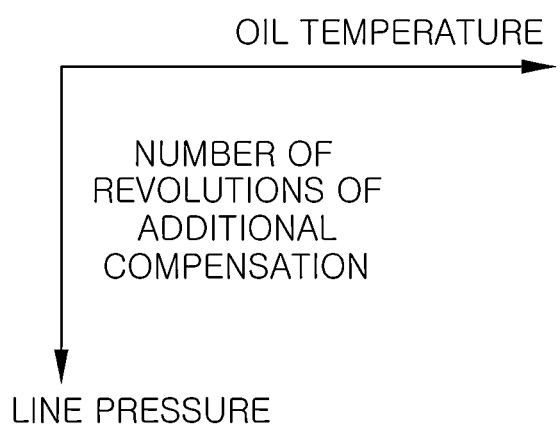
FIG. 5 is a diagram illustrating a map of the number of revolutions of additional compensation according to the line pressure and the oil temperature.

Referring to FIG. 2, an embodiment of a method of controlling an EOP of a vehicle according to the present disclosure is described. The method of controlling an EOP includes: confirming a gear shift type when a gear shift of a vehicle is started (S10); compensating for the number of revolutions of the EOP according to the confirmed gear shift type (S20); confirming whether a measured line pressure converges on a command line pressure while the compensating for the number of revolutions of the EOP according to the gear shift type is performed (S30); and additionally compensating for the number of revolutions of the EOP when it is determined that the measured line pressure does not converge on the command line pressure (S40).

In other words, according to the present disclosure, when the gear shift of the vehicle is started, the compensation is performed at the number of revolutions greater than the number of revolutions of the EOP, which is driven so far so as to supply a required hydraulic pressure according to a shift type. The number of revolutions of the EOP may be maintained relatively low to improve the fuel efficiency of the vehicle and an additional hydraulic pressure may be supplied according to a situation in which a hydraulic pressure is further required during a gear shift.

In addition, as described above, while the number of revolutions of the EOP is compensated for according to the gear shift type, it is confirmed whether the measured line pressure converges on the command line pressure. When it is determined that the measured line pressure does not converge on the command line pressure, the number of revolutions of the EOP is additionally compensated for.

In other words, according to the present disclosure, the compensation for the number of revolutions of the EOP according to the gear shift type, and the compensation for the number of revolutions of the EOP according to a degree of the convergence on the command line pressure, are duplicately performed. These compensations are performed so that compensation is performed for the optimal number of revolutions of the EOP suitable for the currently performed gear shift type. Further, even when an amount of hydraulic leakage is increased due to aged deterioration of a hydraulic circuit of the transmission, compensation for the number of revolutions of the EOP is additionally performed so that stable gear shift performance may always be secured and a gear shift failure may be prevented.

Substantially, the above-described control of the present disclosure may be performed by a controller such as the OPU.

The measured line pressure refers to a line pressure measured by a pressure sensor installed to measure the line pressure in the hydraulic circuit of the transmission. The command line pressure refers to a line pressure commanded by a controller such as the OPU.

When compensating for the number of revolutions of the EOP according to the confirmed gear shift type, the number of revolutions of the EOP is compensated for from a time at which the gear shift is started until a gear shift phase set for each gear shift type becomes a predetermined compensation termination phase.

In other words, each of the various gear shift situations performed in the vehicle is defined as the gear shift type. Also, as shown in FIG. 3, the compensation termination phase is set in advance for each gear shift type. Further, the map set as described above is used so that it is possible to determine whether to compensate for the number of revolutions of the EOP to which gear shift phase in the currently performed gear shift type.

Here, the gear shift phase refers to an operation in which a gear shift is performed in each gear shift type and each gear shift type is divided into a plurality of phases. The total number of gear shift phases is the same in all the gear shift types. As described above, the compensation termination phase is set differently according to a characteristic of each gear shift type.

The compensation termination phase may be mainly set in consideration of an operating time of a solenoid valve operated when a gear shift of each gear shift type is performed.

For example, when the confirmed gear shift type is a power-on up-shift type, the compensation termination phase may be set to a higher gear shift phase than when the gear shift type is a kick-down shift type.

When compensating for the number of revolutions of the EOP according to the confirmed gear shift type, the EOP is controlled at the number of revolutions obtained by adding the number of revolutions for gear shift situation compensation, which is determined according to a current line pressure and an oil temperature, to a basic number of revolutions of the EOP.

Here, the basic number of revolutions of the EOP may refer to the number of revolutions of the EOP before the gear shift is performed. In other words, before the gear shift is performed, the EOP is driven at the basic number of revolutions to maintain the number of revolutions of the EOP as low as possible so as to further improve fuel efficiency of the vehicle.

Since a relatively large amount of a flow rate and a relatively large amount of a hydraulic pressure are consumed in the transmission before the gear shift is performed to reach the compensation termination phase, the EOP is additionally driven by the number of revolutions needed for the gear shift situation compensation to satisfy the above-described need of the transmission.

When confirming whether the measured line pressure converges on the command line pressure, it may be determined that the measured line pressure does not converge on the command line pressure when the measured line pressure is smaller than a pressure obtained by subtracting a predetermined measurement deviation from the command line pressure.

Here, the measurement deviation is for determining whether the line pressure of the hydraulic circuit of the transmission is substantially the same as the command line pressure. In consideration of accuracy and resolution of the pressure sensor, (e.g., for measuring the measurement line pressure), the measurement deviation may be properly set by a number of experiments and interpretations.

When additionally compensating for the number of revolutions of the EOP, the EOP is controlled at the number of revolutions obtained by additionally adding the number of revolutions of additional compensation, which is determined according to the current line pressure and the oil temperature, to the number of revolutions obtained by adding the number of revolutions of the gear shift situation compensation to the basic number of revolutions of the EOP.

In other words, as described above, when frequent operation of the solenoid valve of the hydraulic circuit of the transmission is performed, a situation may occur in which the measured line pressure does not converge on the command line pressure. For instance, the amount of the hydraulic leakage is increased due to aged deterioration or end play of a friction element (such as a clutch) is increased, causing an increase in an accommodation flow rate of the friction element. Thus, in this situation, the EOP is driven at the number of revolutions obtained by adding both of the number of revolutions of the gear shift situation compensation and the number of revolutions of the additional compensation to the basic number of revolutions of the EOP. Thus, even after the aged deterioration of the transmission progresses, a sufficient hydraulic pressure and a sufficient flow rate, which are required for a gear shift, may be continuously supplied.

In addition, when the gear shift phase reaches the compensation termination phase and thus the compensating for the number of revolutions of the EOP according to the gear shift type is terminated, the EOP may be controlled again at the basic number of revolutions of the EOP, thereby contributing to fuel efficiency improvement of the vehicle as much as possible.

In accordance with the present disclosure, in a hybrid vehicle equipped with a hydraulically controlled transmission, a hydraulic pressure required for the transmission may be appropriately supplied, according to a vehicle situation, to improve fuel efficiency of the hybrid vehicle. Even when an amount of hydraulic leakage is increased according to aged deterioration of the transmission, constant gear shift performance can be maintained. Thus, a gear shift failure may be prevented.

Although specific embodiments of the present disclosure have been described and illustrated, those having ordinary skill in the art should appreciate that various alternations and modifications are possible without departing from the technical spirit of the present disclosure as disclosed in the appended claims.

What is claimed is:

1. A method of controlling an electric oil pump (EOP) of a vehicle, the method comprising:
confirming a gear shift type when a gear shift of the vehicle is started;
compensating for a number of revolutions of the EOP according to the confirmed gear shift type;
confirming whether a measured line pressure converges on a command line pressure while the compensating for the number of revolutions of the EOP according to the confirmed gear shift type is performed; and
when it is determined that the measured line pressure does not converge on the command line pressure, additionally compensating for the number of revolutions of the EOP.

2. The method of claim 1, wherein, in the compensating for the number of revolutions of the EOP according to the confirmed gear shift type, the number of revolutions of the EOP is compensated for from a time at which the gear shift is started until a gear shift phase set for each gear shift type becomes a predetermined compensation termination phase.

3. The method of claim 2, wherein, in the compensating for the number of revolutions of the EOP according to the confirmed gear shift type, the EOP is controlled at the number of revolutions obtained by adding a number of revolutions for gear shift situation compensation determined according to a current line pressure and an oil temperature to a basic number of revolutions of the EOP.

4. The method of claim 3, wherein, in the additionally compensating for the number of revolutions of the EOP, the EOP is controlled at the number of revolutions obtained by additionally adding a number of revolutions of additional compensation, which is determined according to the current line pressure and the oil temperature, to the number of revolutions obtained by adding the number of revolutions of the gear shift situation compensation to the basic number of revolutions of the EOP.

5. The method of claim 4, wherein, when the gear shift phase reaches the compensation termination phase and thus the compensating for the number of revolutions of the EOP according to the confirmed gear shift type is terminated, the EOP is controlled at the basic number of revolutions of the EOP.

6. The method of claim 2, wherein, when the confirmed gear shift type is a power-on up-shift type, the predetermined compensation termination phase is set to a higher gear shift phase than when the gear shift type is a kick-down shift type.

7. The method of claim 1, wherein, in the confirming of whether the measured line pressure converges on the command line pressure, when the measured line pressure is smaller than a pressure obtained by subtracting a predetermined measurement deviation from the command line pressure, it is determined that the measured line pressure does not converge on the command line pressure.

* * * * *